United States Patent [19] [11] 4,182,797
Kondo et al. [45] Jan. 8, 1980

[54] PRIMARY BATTERY UTILIZING IODINE CHARGE TRANSFER COMPLEX HAVING A QUATERNARY AMMONIUM GROUP

[75] Inventors: Shigeo Kondo; Nobuyuki Yoshiike, both of Hirakata; Masakazu Fukai, Nishinomiya, all of Japan

[73] Assignee: Matsushita Electric Industrial Co., Ltd., Japan

[21] Appl. No.: 912,257

[22] Filed: Jun. 5, 1978

Related U.S. Application Data

[63] Continuation-in-part of Ser. No. 724,744, Sep. 17, 1976, abandoned.

[30] Foreign Application Priority Data

Sep. 17, 1975 [JP] Japan .................................. 50-112914
Jul. 9, 1976 [JP] Japan .................................. 51-82350

[51] Int. Cl.² .......................................... H01M 6/18
[52] U.S. Cl. .................................... 429/191; 429/199; 429/213; 429/218
[58] Field of Search ............... 429/213, 191, 199, 218, 429/101, 105

[56] References Cited

U.S. PATENT DOCUMENTS

| 3,231,427 | 1/1966 | Kirk et al. ............................ 429/213 |
| 3,352,720 | 11/1967 | Wilson et al. ........................ 429/213 |
| 3,476,605 | 11/1969 | Owens ............................... 429/213 X |
| 3,660,163 | 5/1972 | Moser ............................... 429/213 X |
| 3,674,562 | 7/1972 | Schneider et al. .................. 429/192 |
| 3,749,606 | 7/1973 | De Rossi ......................... 429/192 X |

Primary Examiner—Anthony Skapars
Attorney, Agent, or Firm—Wenderoth, Lind & Ponack

[57] ABSTRACT

This invention relates to a primary battery containing an anode material composed of a light material such as lithium, sodium or magnesium, characterized in that an iodine-added charge transfer complex having quaternary ammonium group is employed as its cathode active material.

13 Claims, 7 Drawing Figures

PRIMARY BATTERY UTILIZING IODINE CHARGE TRANSFER COMPLEX HAVING A QUATERNARY AMMONIUM GROUP

This is a continuation-in-part of Ser. No. 724,744, filed Sept. 17, 1976, now abandoned.

The present invention relates to batteries in which organic iodine compounds are used as the cathode active materials. Generally, batteries in which organic iodine charge transfer complexes are used as the cathode active materials, and a definite type of divalent metal or silver are used as the anode active materials, are well known, as disclosed in the literature (J. Electro Chem. Soc., 114, 323 (1967), and 115, 359 (1968). Another invention provides solid electrolyte batteries in which lithium and magnesium are used as the anode active materials. The cathode active materials used in these batteries include polycyclic aromatic compounds, for example, pyrene, perylene, naphthalene, anthracene, violanthrene, etc., or other heterocyclic compounds containing different types of atoms such as nitrogen or sulfur, for example, pyridine, quinoline, acridine, phenazine, phenothiazine, etc., such cyclic compounds are used as the electron donors. Thus, there is employed an organic iodine charge transfer complex which is formed when the electrons transfer from a $\pi$ electron donor, such as the cyclic compound, to iodine, which is the electron acceptor. The organic iodine charge transfer complex formed in this way is used alone as the cathode active material, or the organic iodine charge transfer complex is formed by mixing with iodine and the complex in the form of a matrix is employed. As indicated by Laid Open Japanese Patent Application No. 30769 of 1972, the electron donor material and iodine, as the electron acceptor material, exist with very low bonding power, and accordingly, they are electrochemically active, while the vaporization of iodine from such an iodine charge transfer complex is vigorous under normal temperature and pressure and further such compound is relatively unstable. Accordingly, the influence on the human body of the vigorous vaporization of iodine from such an organic iodine compound in the actual assembling process of the battery should be specially accounted for. If the actual battery is not well sealed, the vaporization of iodine will badly affect the durability of the battery. Moreover, the corrosion of the battery jar by iodine gas is notable; even battery jars made of stainless steel are corroded, and many other problems are involved.

The present invention seeks to overcome the above-mentioned problems and to provide batteries, the cathode active materials of which minimize the effect of iodine gas on human body during manufacture, which batteries have durability etc., and lend themselves to the manufacture of the electrodes.

Thus, according to this invention, light metals mainly, lithium, sodium, magnesium etc., are used as the anode active materials, and organic polymeric iodine compounds having quaternary ammonium groups are used as the cathode active materials.

First, the cathode active materials used in this invention will be described: such active materials are charge transfer complex composed of quaternary heterocyclic nitrogen compound which behaves as electron acceptor and iodine which behaves as electron donor, quaternary heterocyclic nitrogen compound being charge transfer complex in itself. The novel charge transfer complex of this invention is represented by the formula

$$A^{n_1+} \cdot n_2(BI_x)^-$$

wherein A denotes a quaternary heterocyclic nitrogen compound; B, an atom which forms a monovalent anion; $n_1$, valence number of cation of the quaternary heterocyclic nitrogen compound; $n_2$, number of anions contained, being a real number equal to $n_1$; I, iodine, and x, the number of iodine atoms contained, being a real number larger than 1. These compounds may be obtained by mixing iodine and various alkylammonium iodides listed as examples hereunder:

N-Methylpyridinium iodide

N-Ethylpyridinium iodide

N-n-Hexylpyridinium iodide

-continued

N-Methyl-4-methylpyridinium iodide

N-Methyl-4-ethylpyridiniumiodide

N-Methyl-4-cyanopyridinium iodide

N-Butyl-4-cyanopyridinium iodide

N-Methyl-4-phenylpyridinium iodide

N-Methyl-α-picoliniumiodide

N-Methyl-β-picolinium iodide

N-Methylquinolinium iodide

N-Ethylquinolinium iodide

N-Methylpiperidinium iodide

N-ethyl-piperidinium iodide

N-Methyl imidazolium iodide

N-Methyl-4-benzoylpyridinium iodide

N-Ethyl-2-benzoylpyridinium iodide

N-Heptyl-4-benzoylpyridinium iodide

N-Methyl-isonicotinic acid methyl ester iodide

N-Ethyl-isonicotinic acid iodide methyl ester

N-Methyl-isonicotinic acid ethyl ester iodide

N-Ethyl isonicotinic acid ethyl ester iodide

Such complexes can contain large amounts of iodine. For example, complexes drived from N-methyl pyridinium iodide can contain more than about 10 mol of iodine per 1 mol of this compound. Accordingly, they make cathode active materials with high energy densities.

Representative complex of this invention may be represented by the following three formulas:

Compounds A

Compounds B

Compounds C wherein R denotes alkyl, cycloalkyl, phenyl, phenylalkyl or alkoxycarbonylalkyl; R', denotes hydrogen, alkyl, phenyl, phenylalkyl or nitrile; B, an atom which forms a monovalent anion; x, the number of iodine atoms contained, being a real number larger than 1; and I, iodine.

Representative active materials represented by the compounds A, B and C are shown in Table 1.

Table 1

| No. | Name of Compositions | Structural Formula |
|---|---|---|
| 1 | N-methylpyridinium polyiodide | [pyridinium ring with N$^+$–CH$_3$] · $(I_1 \cdot I_2 \cdot I_3 \ldots I_x)^-$ |
| 2 | N-ethlypyridinium polyiodide | [pyridinium ring with N$^+$–C$_2$H$_5$] · $(I_1 \cdot I_2 \cdot I_3 \ldots I_x)^-$ |
| 3 | N-n-hexylpyridinium polyiodide | [pyridinium ring with N$^+$–C$_6$H$_{13}$] · $(I_1 \cdot I_2 \cdot I_3 \ldots I_x)^-$ |
| 4 | N-methyl-4-methylpyridinium polyiodide | [4-CH$_3$ pyridinium, N$^+$–CH$_3$] · $(I_1 \cdot I_2 \cdot I_3 \ldots I_x)^-$ |
| 5 | N-methyl-4-ethylpyridinium polyiodide | [4-C$_2$H$_5$ pyridinium, N$^+$–CH$_3$] · $(I_1 \cdot I_2 \cdot I_3 \ldots I_x)^-$ |
| 6 | N-methyl-4-cyanopyridinium polyiodide | [4-CN pyridinium, N$^+$–CH$_3$] · $(I_1 \cdot I_2 \cdot I_3 \ldots I_x)^-$ |
| 7 | N-Butyl-4-cyanopyridinium polyiodide | [4-CN pyridinium, N$^+$–C$_4$H$_9$] · $(I_1 \cdot I_2 \cdot I_3 \ldots I_x)^-$ |
| 8 | N-methyl-4-phenylpyridinium polyiodide | [4-phenyl pyridinium, N$^+$–CH$_3$] · $(I_1 \cdot I_2 \cdot I_3 \ldots I_x)^-$ |
| 9 | N-methyl-α-picolinium polyiodide | [2-CH$_3$ pyridinium, N$^+$–CH$_3$] · $(I_1 \cdot I_2 \cdot I_3 \ldots I_x)^-$ |
| 10 | N-methyl-β-picolinium polyiodide | [3-CH$_3$ pyridinium, N$^+$–CH$_3$] · $(I_1 \cdot I_2 \cdot I_3 \ldots I_x)^-$ |

Table 1-continued

| No. | Name of Compositions | Structural Formula |
|---|---|---|
| 11 | N-methyl-4-benzoylpyridinium polyiodide | (structure: 4-benzoylpyridinium with N-CH₃, counterion $(I_1 \cdot I_2 \cdot I_3 \ldots I_x)^-$) |
| 12 | N-ethyl-4-benzoylpyridinium polyiodide | (structure: 4-benzoylpyridinium with N-C₂H₅, counterion $(I_1 \cdot I_2 \cdot I_3 \ldots I_x)^-$) |
| 13 | N-n-heptyl-4-benzoylpyridinium polyiodide | (structure: 4-benzoylpyridinium with N-C₇H₁₅, counterion $(I_1 \cdot I_2 \cdot I_3 \ldots I_x)^-$) |
| 14 | N-methyl-isonicotinic acid methyl ester polyiodide | (structure: isonicotinic acid methyl ester with N-CH₃, counterion $(I_1 \cdot I_2 \cdot I_3 \ldots I_x)^-$) |
| 15 | N-ethyl-isonicotinic acid methyl estr polyiodide | (structure: isonicotinic acid methyl ester with N-C₂H₅, counterion $(I_1 \cdot I_2 \cdot I_3 \ldots I_x)_x^-$) |
| 16 | N-methyl-isonicotinic acid ethyl ester polyiodide | (structure: isonicotinic acid ethyl ester with N-CH₃, counterion $(I_1 \cdot I_2 \cdot I_3 \ldots I_x)^-$) |

Table 1-continued

| No. | Name of Compositions | Structural Formula |
|---|---|---|
| 17 | N-ethyl-isonicotinic acid ethyl ester polyiodide |  |
| 18 | N-methyl quinolinium polyiodide |  |
| 19 | N-ethyl quinolinium polyiodide | |
| 20 | N-N'-dimethyl 4,4'-dipyridinium polyiodide |  |
| 21 | N-N'-dibutyl-4,4'-dipyridinium polyiodide | |

The quaternary heterocyclic nitrogen polyiodides of the present invention may be generally manufactured by reacting organic compounds having quaternary heterocyclic nitrogen compound with iodine or iodine gas. For example, in manufacturing N-ethyl pyridinium polyiodide, one of the aforementioned compounds A, pyridine is reacted with ethyl iodide in an inert solvent such as nitrobenzene, ethanol, etc., to form N-ethyl-pyridinium iodide as shown by the following equation:

Then, N-ethylpyridinium polyiodides may be obtained by making this substance contact iodine or iodine gas.

In the similar manner, other compounds belonging to the compound A may be manufactured. The similar method is also applicable to the compounds B and C.

As the polymerization compounds of the organic polyiodine having quaternary ammonium groups used in the present invention as the cathode active materials, the compounds selected from among the groups represented by the undermentioned general formulae, and the like compounds may be cited:

Compounds D:

$$\left[ \begin{array}{c} -C=C- \\ \diagup \diagdown \\ {}^+N-R \\ | \\ R^1 \end{array} \right]_{n_1} \cdot n_2 [B \cdot (I_1 \cdot I_2 \cdot I_3 \ldots I_x)]^-$$

Compounds E $$\left[ \begin{array}{c} -C=C- \\ R^1 \diagup \diagdown {}^+N-R \\ \end{array} \right]_{n_1} \cdot n_2 [B \cdot (I_1 \cdot I_2 \cdot I_3 \ldots I_x)]^-$$

(where, that is, in the aforementioned compounds D and E, R denotes alkyl, cycloalkyl, phenyl, phenylalkyl or alkoxycarbonyl etc.; R', hydrogen, alkyl, phenyl, phenylalkyl or nitrile, etc., $n_1$, the degree of polymerization, being a real number larger than 1; B, atoms giving monovalent anions, such as iodine, bromine, chlorine, etc.; $n_2$, the amount of anions contained, being a real number equal to $n_1$ which represents the degree of polymerization; and x, the amount of iodine contained, being a real number larger than 1.), and Compound F:

$n_2[(B_1 \cdot B_2) \cdot (I_1 \cdot I_2 \cdot I_3 \ldots I_x)]^-$ (where, that is, in the aforementioned compounds F, $R_1$ and $R_2$ represent hydrogen, alkyl or phenyl, etc.; $R_3$, alkylene group; $B_1$ and $B_2$, atoms giving monovalent anions selected from among the group consisting of iodine, bromine, chlorine, etc.; $n_1$, the degree of polymerization, being a real number at least larger than 1; x, the amount of iodine contained, being a real number larger than 1; and $n_2$, the number of anions, which are a real number equal to $n_1$).

As the organic polymeric iodine compounds, being the cathode active materials of this invention and which are included in the categories of the aforementioned compounds D, compounds E and compounds F, the compounds listed respectively in the following Tables, 2, 3 and 4 may be cited:

Table 2

| No. | Organic Polyiodides Name of compounds | Structural formula |
|---|---|---|
| 1 | Poly-4-vinyl-N-methyl pyridinium polyiodide | $\left[\begin{array}{c}-C=C-\\ \text{pyridinium ring}\\ \overset{+}{N}\\ |\\ CH_3\end{array}\right]_n \cdot n(I_1 \cdot I_2 \cdot I_3 \ldots I_x)^-$ |
| 2 | Poly-4-vinyl-N-ethyl pyridinium polyiodide | $\left[\begin{array}{c}-C=C-\\ \text{pyridinium ring}\\ \overset{+}{N}\\ |\\ C_2H_5\end{array}\right]_n \cdot n(I_1 \cdot I_2 \cdot I_3 \ldots I_x)^-$ |
| 3 | Poly-4-vinyl-N-methyl-pyridinium chloro polyodide | $\left[\begin{array}{c}-C=C-\\ \text{pyridinium ring}\\ \overset{+}{N}\\ |\\ CH_3\end{array}\right]_n \cdot n[(Cl) \cdot (I_1 \cdot I_2 \cdot I_3 \ldots I_x)]^-$ |
| 4 | Poly-4-vinyl-N-methyl-2-cyano-pyridinium polyiodide | $\left[\begin{array}{c}-C=C-\\ \text{pyridinium ring with CN}\\ \overset{+}{N}\\ |\\ CH_3\end{array}\right]_n \cdot n(I_1 \cdot I_2 \cdot I_3 \ldots I_x)^-$ |
| 5 | Poly-4-vinyl-N-methyl pyridinium bromo-polyiodide | $\left[\begin{array}{c}-C=C-\\ \text{pyridinium ring}\\ \overset{+}{N}\\ |\\ CH_3\end{array}\right]_n \cdot n[(Br) \cdot (I_1 \cdot I_2 \cdot I_3 \ldots I_x)]^-$ |
| 6 | Poly-2-vinyl-N-methyl pyridinium polyiodide | $\left[\begin{array}{c}-C=C-\\ \text{pyridinium ring}\\ +N-CH_3\end{array}\right]_n \cdot n(I_1 \cdot I_2 \cdot I_3 \ldots I_x)^-$ |
| 7 | Poly-3-vinyl-N-methyl pyridinium polyiodide | $\left[\begin{array}{c}-C=C-\\ \text{pyridinium ring}\\ +N-CH_3\end{array}\right]_n \cdot n(I_1 \cdot I_2 \cdot I_3 \ldots I_x)^-$ |

Table 3.

Organic Polyiodides

| No. | Name of compounds | Structural formula |
|---|---|---|
| 1 | Poly-4-vinyl-N-methyl quinolinium polyiodide | $\left[\begin{array}{c}-C=C-\\ \text{(4-quinolinium, N-CH}_3\text{)}\end{array}\right]_n \cdot n(I_1 \cdot I_2 \cdot I_3 \ldots I_x)^-$ |
| 2 | Poly-4-vinyl-N-ethyl-quinolinium polyiodide | $\left[\begin{array}{c}-C=C-\\ \text{(4-quinolinium, N-C}_2\text{H}_5\text{)}\end{array}\right]_n \cdot n(I_1 \cdot I_2 \cdot I_3 \ldots I_x)^-$ |
| 3 | Poly-4-vinyl-n-methyl quinolinium polyiodide | $\left[\begin{array}{c}-C=C-\\ \text{(4-quinolinium, N-CH}_3\text{)}\end{array}\right]_n \cdot n[(Cl) \cdot (I_1 \cdot I_2 \cdot I_3 \ldots I_x)]^-$ |
| 4 | Poly-3-vinyl-N-methyl quinolinium polyiodide | $\left[\begin{array}{c}-C=C-\\ \text{(3-quinolinium, }^+\text{N-CH}_3\text{)}\end{array}\right]_n \cdot n[(I_1 \cdot I_2 \cdot I_3 \ldots I_x)]^-$ |
| 5 | Poly-2-vinyl-N-methyl quinolinium polyiodide | $\left[\begin{array}{c}-C=C-\\ \text{(2-quinolinium, }^+\text{N-CH}_3\text{)}\end{array}\right]_n \cdot n(I_1 \cdot I_2 \cdot I_3 \ldots I_x)^-$ |

Organic Polyiodides

| No. | Name of compounds | Structural formula |
|---|---|---|
| 1 | Poly-N-methylene-4,4'-dipyridinium polyiodide | $\left[-N^+\text{(pyridyl-pyridyl)}^+N-CH_2-\right]_n \cdot n(I_1 \cdot I_2 \cdot I_3 \ldots I_x)^{--}$ |
| 2 | Poly-N-methylene-4,4'-dipyridinium polyiodide | $\left[-N^+\text{(pyridyl-pyridyl)}^+N-C_2H_4-\right]_n \cdot n(I_1 \cdot I_2 \cdot I_3 \ldots I_x)^{--}$ |

Although, the cathode active materials of this invention, the compounds D and the compound E abovelisted are comprehensively expressed by the general formulae, whichever isomer represented by the following formulae may be adopted.

As for the compounds D,

$\cdot n[B \cdot (I_1 \cdot I_2 \cdot I_3 \ldots I_x)]^-$,

$n[B \cdot (I_1 \cdot I_2 \cdot I_3 \ldots I_x)]^-$ or $\cdot n[B \cdot (I_1 \cdot I_2 \cdot I_3 \ldots I_x)]^-$, and the compounds E;

$\cdot n[B \cdot (I_1 \cdot I_2 \cdot I_3 \ldots I_x)]^-$, $\cdot n[B \cdot (I_1 \cdot I_2 \cdot I_3 \ldots I_x)]^-$ or

$\cdot n[B \cdot (I_1 \cdot I_2 \cdot I_3 \ldots I_x)]^-$.

The organic polyiodides of this invention may be generally manufactured by reacting organic compounds having quarternary ammonium groups with iodine and iodine gas.

For example, in manufacturing poly-4-vinyl-N-methyl pyridinium polyiodide, one of the aforementioned compounds D, poly-4-vinyl pyridine is reacted with methyl iodide in an inert solvent such as nitrobenzene, ethanol, etc., to form, at first poly-4-vinyl-N-methyl pyridinium iodide as shown by the following equation:

Then, poly-4-vinyl-N-methyl pyridinium polyiodides may be obtained by contacting this substance with iodine and iodine gas;

In a similar manner, other compounds belonging to A may be manufactured. The similar method is applicable to the compounds E, too. Thus, they may be manufactured by reacting polyvinyl quinoline or its derivatives with compounds represented by R Y (where R and Y denote the aforementioned substituting groups including methyl iodide, ethyl iodide, methyl chloride, methyl bromide, etc., in some inert solvents, and then contacting iodine or iodine gas with the resultant compounds.

With regard to the compounds F, for example, poly-N-methylene-4,4'-dipyridium polyiodide may be readily manufactured by reacting 4'-dipyridine with methylene diiodide in an inert solvent, thereby forming poly-N-methylene-4,4'-dipyridinium diiodide, and then contacting this substance with iodine or iodine gas. Other compounds may be similarly manufactured.

In the organic polyiodides of this invention, the atoms giving monovalent anions which are specifically represented by B in the formulae of the compounds A, B, C, D, E and F should most desirably be iodine atoms in light of their reactivity in forming the polyiodides and high energy density obtainable when the battery is composed. However, they are not specifically limited to iodine, nor to the atoms giving monovalent anions indicated for the above-listed compounds A, B, C, D, E and F.

In the organic polyiodides of this invention, x representing the amount of iodine is a real number larger than 1. In light of the high energy density required when the battery is composed in this way, it should desirably be a large as possible. If the iodine content is too large, however, the charge transfer between the monovalent anion and the terminal iodine becomes weak; as a consequence, the bonding power between iodine atoms weakens, approaching that between single iodine atoms. Thus, the vaporization to iodine gas under the normal temperature and pressure becomes nearly identical to that from its singly isolated state. Accordingly, it is desirable to have x ≦ about 10.

The present invention is based on the finding that the electrochemical property of the organic polyiodide obtained as above described as a vital element of this invention, is very active, like the conventional organic iodine charge transfer complexes, thus permitting them to be used as the cathode active materials of batteries.

In the following, the electrode reactions in the batteries of this invention are described. In the batteries of this invention, the reactions in the cathode and the anode are believed to proceed in the following manner:

The reaction at the cathode:

$$I_2 + 2e \rightarrow 2I^-$$

The reaction at the anode:

$$(2/m)M \rightarrow (2/m)M^- + 2e$$

Then, the over-all reaction in the battery:

$$I_2 + (2/m)M \rightarrow (2/m)MI$$

where M designates the metals which electrochemically react with iodine, and m gives the valency of the metal atoms.

Taking N-methyl pyridinium polyiodine or poly-4-vinyl-N-methyl pyridinium polyiodides as an example, it seems very probable that $I_2$ is liberated gradually in the course of discharge as shown hereunder:

The iodine atoms used are still more strongly bonded with the quaternary ammonium group in the organic polyiodides of this invention than in the organic iodine charge transfer complexes hitherto used as the cathode active materials of batteries. For this reason, the vaporization of iodine under the normal temperature and pressure is distinctly slight. Furthermore, this invention is based on the finding that the organic polyiodides of this invention, being formed of a plural number of polymerized organic compounds having quartarnary ammonium group, are plastic and electrochemically very active, thus permitting them to be used as the cathode active materials of batteries, and that with such materials, as used in the electrodes of batteries, high flexibility in the way of forming their inside structures is achieved, or it is possible to compose a variety of batteries such as thin film shape batteries, etc.

This invention will now be described in connection with the following embodiments.

Figure 1:
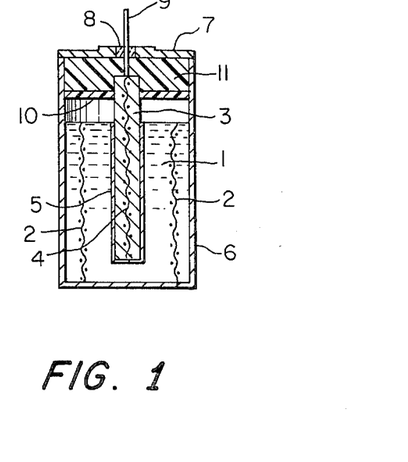
FIG. 1 shows a schematic cross-sectional view of the battery embodying this invention.

FIG. 1 shows an example of the battery construction of this invention. Referring to this figure, 1 denotes a cathode active material; 2, collector bodies of titanium net, stainless steel net, etc., being placed in contact with the cathode active material, which are welded onto a battery case 6. The cathode active material is a charge transfer complex of iodine with quarternary ammonium group. Most of such complexes having high electron conductivities of the order of about $10^{-1}$ $v$ A/cm, require no use of the collector bodies at the discharge rates of the order of 10 $\mu$A/cm$^2$ The objective of making the discharge rates high may be fulfilled by providing the collector bodies 2 or by adding an inert conductor powder.

3 stands for an anode of metallic lithium into which a collector body 4 of nickel net, stainless net, etc., is impressed. When this anode is put in the cathode active material 1, a thin film electrolyte layer 5 of lithium iodide is formed on its surface. 7 represents a sealing cover plate formed of stainless steel. At the center of the sealing cover plate 7, an anode terminal 9 is provided with a glass 8 interposed to provide insulation as well as air-tightness. 10 designates an insulating board, and 11 a sealing material such as epoxy resin filled in the space above the board. The battery case 6 and the sealing cover plate 7 are air-tightly bonded by way of welding.

It is also possible to further improve the high rate discharge characteristic by adding propylenecarbonate to the cathode active material.

Figure 2:
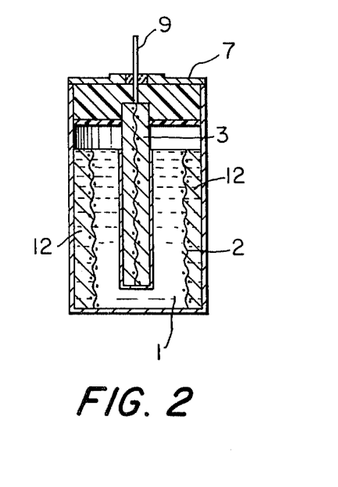
FIG. 2 exhibits a schematic cross-sectional view showing an another embodiment of the battery of this invention.

It is also possible to adopt such a construction as shown in FIG. 2 for this battery system in order to have further increased energy density. Thus, surplus solid iodine 12 is added into the battery case 6, so that the iodine consumed by the discharge may be compensated for by supplementarily supplying solid iodine into the complex of the cathode active material.

Furthermore, in an attempt to improve the ionic conductivity of the thin film layer of lithium iodide of the solid electrolyte, a divalent metal, e.g., a lithium-calcium alloy with calcium added, is used as the anode, to form the electrolyte of calcium-lithium iodide. In that way, it is possible to attain improved ionic conductivity and a high rate of discharge.

Figure 3:
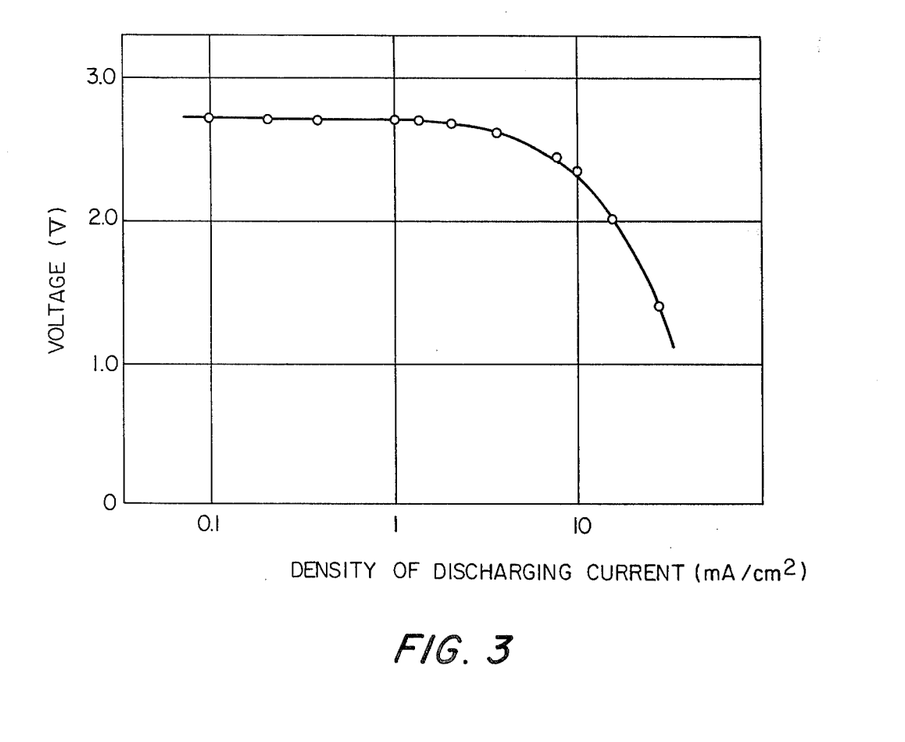
FIG. 3 is a graph showing a relation between current and voltage characteristics.

FIG. 3 depicts the current-voltage characteristics of a newly prepared battery in which lithium is used as its anode active material, and a charge transfer complex formed by adding 10 moles of iodine to 1 mole of N-ethyl pyridinium iodide as its anode active material. This battery gave an open circuit voltage of 2.90 V, and barely showed a change in the temperature range of 50° C.-25° C.

Figure 4:
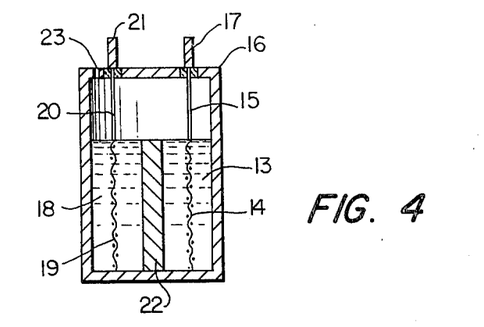
FIG. 4 depicts a schematic cross-sectional view showing an another embodiment of the battery of this invention.
Figure 5:
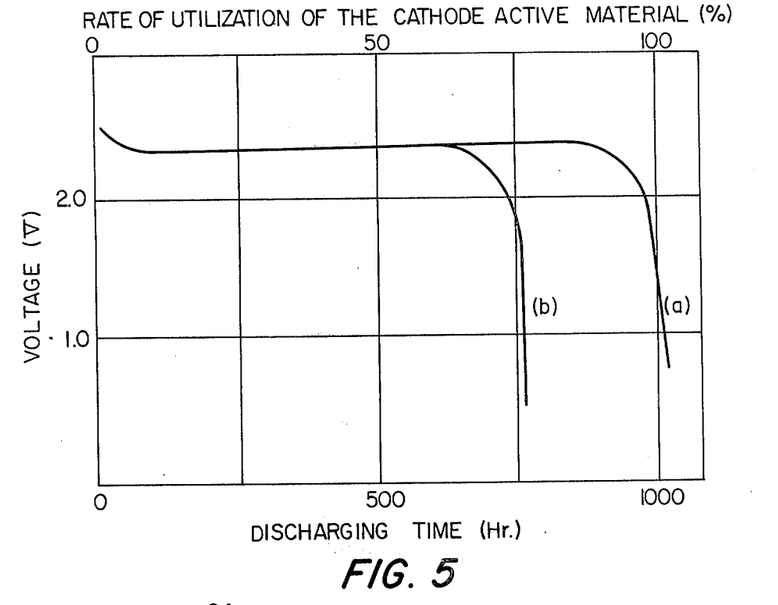
FIG. 5 is a graph showing discharge characteristics of the battery of FIG. 4.

FIG. 4 shows a schematic construction of the another battery in accordance with this invention. Referring to this figure, 13 denotes the electrode formed of metallic lithium as the anode active material in the shape of a plate 1×1×0.1 cm in size with a stainless steel net collector 14 being impressed into the said electrode; from this electrode, a stainless steel lead wire 15 is led through a battery case 16 made of polyethylene, and is connected to a cathode terminal 17. Numeral 18 designates a plastic anode active material consisting of poly-4-vinyl-N-methyl quinolinium hexaiodide, into which the titanium net collector 19 is impressed, and from which the titanium lead wire 20 is led through the battery case 16, and is connected to an cathode terminal 21. 22 stands for a solid electrolyte layer mainly consisting of lithium iodide. 23 represents a hole 1 mm in diameter provided at the top of the battery case for the purpose of examining the loss of battery capacity due to the vaporization of the cathode active material. The battery formed in this way was discharged in a desiccator with a 2 liter capacity. Another battery of the similar structure in which poly-4-vinyl-quinolinium hexaiodine was formed together with the aforementioned. The characteristics of these batteries examined are shown in FIG. 5. In FIG. 5, the discharge characteristic (a) obtained by discharging the battery of this invention at 40 $\mu$A and the discharge characteristic (b) of the conventional battery in which poly-4-vinyl quinolinium hexaiodine, one of the conventional iodine charge transfer complexes, is used are compared. The utilization of the cathode active material of the battery in accordance with this invention is determined to 100%. The graph clearly shows that the battery of this invention, as compared with the conventional one, excells especially in the rate of utilization of the cathode active material. In the conventional battery, the vaporization of iodine from the cathode active material is vigorous; iodine is observed being deposited on the glass wall inside the desiccator used as the discharge container, due to the escape of iodine, being the active material, into the desiccator from the inside of the battery, the rate of utilization of the cathode active material is reduced. In contrast, in the battery of this invention, almost no vaporization of iodine is formed, in contrast to the conventional battery and this explains the very high rate of utilization of the instant battery. A nearly similar tendency as the effect of the use of the active materials of this invention was observed with other embodiments.

Figure 6:
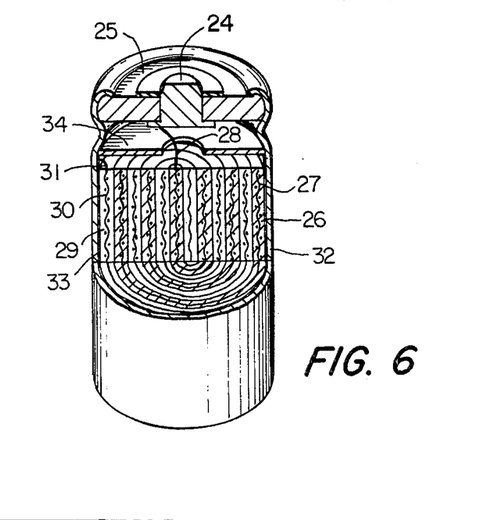
FIG. 6 provides a schematic constructional sketch showing an another embodiment of the battery of this invention.

FIG. 6 provides a schematic constructional view showing a further embodiment of the battery of this invention realized by taking advantage of the plastic behavior of the electrode. Referring to this figure, 24, denotes a cathode terminal made of stainless steel; 25, an opening end sealing plate made of polyethylene; 26, a cathode active material, being poly-4-vinyl-N-methyl pyridinium decaiodine; 27, a cathode collector, being a titanium expanded net, 28, a stainless steel lead wire connecting the cathode collector 27 and the cathode terminal; 29, an anode active material, being metallic lithium; 30, an anode collector, being stainless steel expanded net; 31, a titanium lead wire connecting the anode collector 30 but not in contact with cathode material and a battery case 32 made of stainless steel; 33, a separator made of polyethylene for preventing direct contact between the electrode plate groups and the battery case 32; and 34, an insulating board made of polyethylene. The electrolyte of this battery, not shown in the figure of this embodiment, is formed as a solid electrolyte layer of lithium iodide as the main component formed by communicating the cathode and the anode just as shown in FIG. 4. This embodiment has been realized by composing the spiral electrode groups, taking advantage of the plastic behavior of the cathode active material which permits free choice of configuration.

Figure 7:
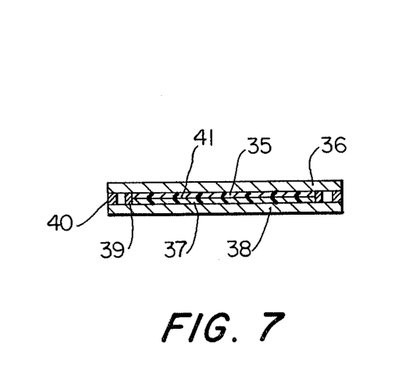
FIG. 7 represents a schematic constructional view showing a further embodiment of the battery of this invention.

FIG. 7 represents a schematic constructional view showing an embodiment of the battery of this invention realized by taking advantage of the property related to the possibility of forming the cathode active material in film shape.

Referring to this figure, 35 refers to a cathode active material film of poly-4-vinyl-N-methyl pyridinium hexaiodine which is formed by dissolving poly-4-vinyl-N-methyl pyridinium hexa iodide in a solvent, like acetone, capable of dissolving plastic organic polyiodide, thereafter, applying the solution on a circular metal substrate of stainless steel 36 which is doubles as the cathode terminal, followed by evaporation of acetone. 37 denotes a lithium film impressed on the circular metal substrate of stainless steel which is doubles as the anode terminal 38. These cathode and anode materials are impressed integrally together to form an integral body with a circular spacer 39 interposed between them, are then, bonded with epoxy resin, and furthermore, the opening end is sealed with a ceramic adhesive 40. In this way, a battery with 1 mm total thickness is formed, and in the process of integration by pressing, a solid electrolyte layer 41 of lithium iodide as the main component is formed in the space between the cathode 35 and the anode 36.

The above described batteries presented as embodiments produce open circuit voltages of about 2.9 volts. With these batteries, a high rate discharge such as about 10 mA/cm² is possible immediately after their manufacture, as shown FIG. 3 but is becomes difficult to have such high rate discharge after a whole day and night. Then, they find their optimal use as batteries for low rate discharge, for example, as the power sources for clocks or for pace makers. As described in the foregoing, in the batteries of this invention, because the vaporization of iodine from the organic iodides, being the cathode active materials, is almost suppressed, (1) the sealing of the open end of the battery is easy and especially effective, if an adhesive as in the battery shown FIG. 7 is used (2) the corrosion of the battery case and the lead wire by the vaporized iodine is slight, permitting stainless steel to be used relatively stably (in the conventional batteries, its use is considered difficult); (3) the active materials of the battery are stable in use because even when the battery is not perfectly air-tight, the escape of iodine from the inside of the battery is quite small as compared with that in the conventional batteries; (4) the lengthening of the life span of the battery is possible on account of (1) and (2); and (5) improved flexibility of the structure inside the battery if obtainable because of the plastic behavior of the electrode, permitting the batteries with large electrode areas, and thus batteries with a high rate discharge, can be easily manufactured; and (6) the cathode active materials may be formed in the shape of a film, thus making it possible to produce film shaped batteries, and so on. Such remarkable effects as described above, making this invention of high industrial value.

What we claim is:

1. A primary battery which comprises: an anode material comprising lithium; a cathode material comprising an iodine containing charge transfer complex having a quaternary ammonium group, said complex having the formula:

wherein A denotes a quaternary heterocyclic nitrogen compound; B, an atom which forms a monovalent anion; $n_1$, the valence number of the cation of the quaternary heterocyclic nitrogen compound; $n_2$, the number of anions contained, being a real number equal to $n_1$; I, iodine; x, the number of iodine atoms contained, being a real number larger than 1, and a solid electrolyte comprising lithium iodide which is produced between said cathode material and said anode material by bringing said anode material into direct contact with said cathode material.

2. A primary battery according to claim 1, wherein the complex is at least one compound selected from the group consisting of the compounds represented by the following formula wherein R denotes alkyl, cycloalkyl, phenyl, phenylalkyl or alkoxycarbonylalkyl; R' denotes hydrogen, alkyl, nitro or nitrile; and x, the number of iodine atoms contained, being a real number larger than 1.

3. A primary battery according to claim 2, wherein said B is iodide.

4. A primary battery according to claim 1, wherein the complex is at least one compound selected from the group consisting of the compounds represented by the following formula wherein R denotes alkyl, cycloalkyl, phenyl, phenylalkyl or alkoxycarbonylalkyl; R' denotes hydrogen, alkyl, nitro or nitrile; and x, the number of iodine atoms contained, being a real number larger than 1.

5. A primary battery according to claim 4, wherein said B is iodide.

6. A primary battery according to claim 1, wherein the complex is at least one compound selected from the group consisting of the compounds represented by the following formula wherein R denotes alkyl, cycloalkyl, phenyl, phenylalkyl or alkoxycarbonyl; R' denotes hydrogen, alkyl or nitrile; and x, the number of iodine atoms contained, being a real number larger than 1.

7. A primary battery according to claim 6, wherein said B is iodide.

8. A primary battery which comprises: an anode material comprising lithium; a cathode active material comprising an iodine containing plastic, organic, quaternary, heterocyclic nitrogen, iodide compound selected from the group consisting of wherein R denotes alkyl, cycloalkyl, phenyl, phenylalkyl or alkoxycarbonylalkyl; R' denotes hydrogen, alkyl, nitro or nitrile, $n_1$, the degree of polymerization, being a real number larger than 1, B, an atom which forms a monovalent anion; $n_2$, number of anions contained, being a real number equal to $n_1$ which gives a degree of polymerization; and x, number of iodine atoms contained, being a real number larger than 1; and a solid electrolyte containing at least LiI and being provided between said anode material and said cathode material.

9. A primary battery according to claim 8, wherein the organic iodine compound represented by the formula includes polyvinyl-quaternary pyridinium polyiodide and it's derivative which is at least one compound selected from the group consisting of the compounds represented by the following formula:

10. A primary battery which comprises: an anode material comprising lithium; a cathode active material comprising an iodide containing plastic, organic, quaternary, heterocyclic nitrogen, iodide compound selected from the group consisting of compounds represented by the following formula:

wherein R denotes alkyl, cycloalkyl, phenyl, phenylalkyl or alkoxycarbonyl; R', hydrogen, alkyl, phenyl, phenylalkyl, nitro or nitrile; $n_1$, the degree of polymerization, being a real number larger than; B an atom which forms a monovalent anion; $n_2$, number of anions contained, being a real number equal to $n_1$ which gives a degree of polymerization; and x, number of iodine atoms contained, being a real number larger than 1; and a solid electrolyte containing at least LiI and being provided between said anode material and said cathode material.

11. A primary battery according to claim 9, wherein the organic iodine compound represented by the general formula is polyvinyl quaternary quinolinium polyiodide and its derivative, which is at least one compound selected from the group consisting of the compounds represented by the following formula:

wherein R denotes alkyl, cycloalkyl, phenyl, phenylalkyl or alkoxycarbonylalkyl; R', hydrogen, alkyl, phenyl, phenylalkyl, nitro or nitrile; $n_1$, the degree of polymerization, being a real number larger than 1; x, number of iodine atoms contained, being a real number larger than $n_1$; and $n_2$, number of anions, being a real number equal to $n_1$.

12. A primary battery which comprises: an anode material comprising lithium; a cathode active material comprising an iodide containing plastic, organic, quaternary, heterocyclic nitrogen, iodide compound is at least one compound selected from the group consisting of the compounds represented by the following formula:

wherein $R_1$ and $R_2$ denote hydrogen, alkyl, cycloalkyl, phenyl, phenylalkyl or alkoxycarbonylalkyl, $R_3$, alkylene; $B_1$ and $B_2$, atoms which form monovalent anions; $n_1$, the degree of polymerization, being a real number at least larger than 1; x, number of iodine atoms contained, being a real number at least larger than 1; and $n_2$, number of anions, being equal to $n_1$.

13. A primary battery according to claim 12, wherein the organic iodine compound represented by the formula includes poly-4,4'-di-quaternary pyridinium polyiodide and its derivative which is at least one compound selected from the group consisting of the compounds represented by the following formula:

wherein $R_1$ and $R_2$ denote hydrogen, alkyl, cycloalkyl, phenyl, phenylalkyl or alkoxycarbonylalkyl; $R_3$, alkylene; $n_1$, the degree of polymerization, being a real number at least larger than 1; x, number of iodine atoms contained, being a real number at least larger than 2; and $n_2$, number of anions, being a real number equal to $n_1$.

* * * * *